US006611145B2

(12) United States Patent
Lodise et al.

(10) Patent No.: US 6,611,145 B2
(45) Date of Patent: *Aug. 26, 2003

(54) MOTORCYCLE HAVING A SYSTEM FOR COMBUSTION DIAGNOSTICS

(75) Inventors: V. Dennis Lodise, Pewaukee, WI (US); Eric Norppa, Pewaukee, WI (US); Frederick K. Lenhart, Kokomo, IN (US); Barth Fisk, Fishers, IN (US)

(73) Assignees: Harley-Davidson Motor Company Group, Inc., Milwaukee, WI (US); Delphi Technologies, Inc., Troy, MI (US)

( * ) Notice: Subject to any disclaimer, the term of this patent is extended or adjusted under 35 U.S.C. 154(b) by 135 days.

This patent is subject to a terminal disclaimer.

(21) Appl. No.: 09/902,053

(22) Filed: Jul. 10, 2001

(65) Prior Publication Data

US 2002/0007818 A1 Jan. 24, 2002

Related U.S. Application Data

(63) Continuation-in-part of application No. 09/619,992, filed on Jul. 20, 2000, now Pat. No. 6,386,183.

(51) Int. Cl.[7] .......................... F02P 17/00; G01L 23/22
(52) U.S. Cl. .................. 324/378; 324/402; 123/406.26; 73/35.08
(58) Field of Search .................. 324/378, 380, 324/391, 402; 123/406.21, 406.27, 406.26, 406.29; 73/35.08, 35.01, 35.03, 35.06

(56) References Cited

U.S. PATENT DOCUMENTS

| 4,307,603 | A | | 12/1981 | Dobler et al. |
| 4,648,367 | A | | 3/1987 | Gillbrand et al. |
| 4,862,093 | A | | 8/1989 | Jiewertz |
| 5,283,527 | A | * | 2/1994 | DeBiasi ....................... 324/391 |
| 5,343,844 | A | * | 9/1994 | Fukui et al. ................. 123/481 |
| 5,653,209 | A | | 8/1997 | Johansson et al. |
| 5,676,113 | A | | 10/1997 | Johansson et al. |
| 5,694,900 | A | | 12/1997 | Morita et al. |
| 5,769,049 | A | | 6/1998 | Nytomt et al. |
| 5,775,298 | A | | 7/1998 | Haller |
| 5,803,047 | A | | 9/1998 | Rask |
| 5,896,842 | A | | 4/1999 | Abusamra |
| 5,907,243 | A | | 5/1999 | Goras et al. |
| 5,992,386 | A | | 11/1999 | Nytomt et al. |
| 6,029,640 | A | | 2/2000 | Bengtsson et al. |
| 6,032,650 | A | | 3/2000 | Rask |
| 6,091,244 | A | * | 7/2000 | Rottler ....................... 324/378 |
| 6,386,183 | B1 | * | 5/2002 | Lodise et al. .......... 123/406.21 |

* cited by examiner

*Primary Examiner*—Anjan K. Deb
(74) *Attorney, Agent, or Firm*—Michael Best & Friedrich LLP

(57) ABSTRACT

A motorcycle including a two-cylinder engine. The engine includes a housing, first and second cylinders having first and second combustion chambers, respectively, and first and second pistons reciprocating in the first and second chambers, respectively. The motorcycle further includes a spark generating circuit including a spark plug having a spark gap exposed to the first combustion chamber, an ion sensing circuit including the spark plug and being operable to generate an ion signal indicative of an ion current generated across the spark gap, and an analysis module coupled to the ion signal circuit. The analysis module is operable to receive the ion signal and to analyze the ion signal to determine whether a no-combustion event occurs in the first cylinder. The analysis module may be further operable to determine if the spark generating circuit has an intermittent connection.

33 Claims, 13 Drawing Sheets

| FIG. 4A |
|---|
| FIG. 4B |
| FIG. 4C |
| FIG. 4D |
| FIG. 4E |

MOTORCYCLE HAVING A SYSTEM FOR COMBUSTION DIAGNOSTICS

RELATED APPLICATIONS

This application is a continuation-in-part of Title 35, United States Code, §120 of the U.S. patent application Ser. No. 09/619,992, entitled MOTORCYCLE HAVING SYSTEM FOR COMBUSTION KNOCK CONTROL, filed on Jul. 20, 2000, granted U.S. Pat. No. 6,386,183.

BACKGROUND OF THE INVENTION

The present invention relates to a motorcycle including a diagnostic system, and particularly a motorcycle including a diagnostic system that analyzes an ion signal for determining whether combustion occurred and for determining whether the spark generating circuit has an intermittent connection.

Ideally, combustion in an engine's combustion chamber propagates from the spark plug through the combustible mixture along a controlled combustion wave. Knock occurs when the combination of the local pressure and heat within the combustion chamber is above the requisite local pressure and heat required for spontaneous combustion. This results in spontaneous combustion or auto-ignition being ahead of the combustion wave.

It is known to control knock in a four-cylinder, water-cooled automobile engine. One method entails obtaining an ion signal representing ionization across the spark gap of a spark plug. After obtaining the ion signal, a controller detects whether knock is present within the combustion chamber. If the controller detects knock, then the controller will vary the timing of the spark event. However, prior art two-cylinder, air-cooled motorcycle engines did not control knock within the engine, and were forced to accept the resulting loss of power. Prior art motorcycles did not have the necessary control and processing power required to implement knock control.

SUMMARY OF THE INVENTION

One of the characteristics of a two-cylinder, air-cooled engine (e.g., a two-cylinder, air-cooled motorcycle engine) is that the engine runs much hotter than a water-cooled engine (e.g., a water-cooled automobile engine). The most obvious reason for this is that water-cooled engines use a coolant for promoting heat removal, whereas air-cooled engines rely substantially on air-flow for heat removal. This problem is intensified if the motorcycle is running in warm surroundings. The increased running temperature of the motorcycle engine and increased temperature of the intake air results in an increased temperature within the combustion chamber and, consequently, the motorcycle engine is more susceptible to knock.

A second problem that arises with two-cylinder, air-cooled motorcycle engines is that air-cooled engines have a larger engine temperature range than water-cooled engines. That is, because air-cooled engines do not contain a liquid coolant, the engine temperature varies over a larger temperature range than water-cooled engines. Even further, a large number of motorcycle engines cannot be calibrated for spark timing at the peak power or peak. These motorcycle engines are calibrated at peak pressure because that is the point where the most amount of output power for the engine can be achieved without knock damage. Depending on how conservative the calibration is at elevated temperatures, knock can be an issue.

Knock is even more prevalent in two-cylinder, V-twin, air-cooled motorcycle engines having one cylinder positioned in front of the other. In such an engine, the rear cylinder typically runs hotter than the front cylinder because the rear cylinder receives less airflow then the front cylinder. The increased temperature for the rear cylinder results in the rear cylinder being more susceptible to knock than the front cylinder. Therefore, it would be beneficial to create a controller for performing knock control in a two-cylinder air-cooled motorcycle engine, and particularly in a two-cylinder, V-twin, air-cooled motorcycle engine.

The invention provides a motorcycle including a frame, front and rear wheels coupled to the frame for rotation with respect to the frame, and a two-cylinder engine mounted to the frame. The engine includes a housing, a crankshaft mounted for rotation within the housing, first and second cylinders having first and second combustion chambers, respectively, and first and second pistons reciprocating in the first and second cylinders, respectively. The engine of the motorcycle is preferably a two-cylinder, V-twin, air-cooled engine having one cylinder positioned in front of the other. The motorcycle further includes a spark generating circuit including a spark plug having a spark gap exposed to the first combustion chamber. The spark generating circuit produces a spark across the spark gap in response to a spark-inducing signal. The motorcycle further includes an ion signal circuit that provides an ion signal indicative of an ion current being generated across the spark gap. The motorcycle further includes an analysis module electrically connected to the ion signal circuit and the spark generating circuit. The analysis module generates the spark-inducing signal in a timed sequence, receives the ion signal from the ion signal generating circuit, measures a knock intensity within the ion signal, and modifies the timing sequence in response to an indication of knock in the first cylinder.

The motorcycle may further include a fuel injector having a fuel injector circuit. The fuel injector provides an amount of fuel to the combustion chamber in response to a fuel injector signal being provided to the fuel injector circuit. The fuel injector circuit is electrically connected to the analysis module. The analysis module generates the fuel injector signal and modifies the fuel injector signal in response to an indication of knock within the first cylinder.

The motorcycle may further include a second spark generating circuit substantially identical to the first spark generating circuit and a second ion signal circuit for use with the second cylinder. The analysis module is electrically connected to the second ion signal circuit and the second spark generating circuit and functions as described above to modify the second timing sequence. The provision of a second circuit facilitates separate control of the first and second cylinders.

In a second embodiment, the invention provides a motorcycle including a spark generating circuit having a spark plug. The spark plug includes a spark gap exposed to the first combustion chamber. The spark generating circuit produces a spark across the spark gap in response to a spark-inducing signal. The motorcycle further includes an ion signal circuit that generates an ion signal indicative of an ion current being generated across the spark gap. The motorcycle further includes a conditioning chip that receives the ion signal and generates a knock intensity signal. The motorcycle further includes a processor and software for operating the processor to provide a spark-inducing signal at a timed sequence, to determine whether the knock intensity signal represents knock within the first cylinder, and to modify the timed sequence in response to an indication of knock in the first cylinder.

The invention further provides a method of varying a spark event in a two-cylinder engine of a motorcycle. The method includes the acts of providing a motorcycle, generating a first spark in a first combustion chamber of the motorcycle with the first spark plug when the first piston is in a first position, obtaining an ion signal indicative of an ion current across the first spark plug gap, determining if the ion signal indicates knock within the first cylinder, and generating a second spark in the first combustion chamber with the first spark plug when the piston is in a second position and in response to an indication of knock in the first cylinder. In one embodiment, the second position is different than the first position.

The invention further provides a software program for determining whether knock is present within a motorcycle engine. The software program detects knock by repeatedly sampling a position signal indicative of a position of a first piston in a first cylinder, generating a first spark signal resulting in a first spark being generated in the first cylinder when the piston is in a first position, sampling a knock intensity portion of an ion signal, providing a threshold value, comparing the sample with the threshold value to determine if knock is present within the first cylinder, and generating a second spark signal resulting in a second spark being generated in the first combustion chamber when the piston is in a second position and in response to knock being present in the first cylinder.

In addition to determining if knock is present within the motorcycle, the ion signal may be further analyzed to determine if one of the cylinders did not produce combustion in response to a spark-inducing signal. That is, when the microprocessor generates a spark-inducing signal for one of the cylinders, ideally, the respective spark plug generates a spark in the spark gap and combustion results. During combustion, gasses ionize thereby generating an ion current. If low or no ion current is produced, then combustion did not properly occur. This might occur if a spark plug is malfunctioning, a spark plug cable is unhooked, an error is occurring within the fuel system, etc. Such events are generally referred to as no-combustion events, even though combustion of a small amount of fuel in the cylinder may in fact have occurred. Therefore, the ion signal may be further analyzed to determine if a spark-inducing signal resulted in a spark event.

Accordingly, in another embodiment, the invention further provides a motorcycle including a frame, front and rear wheels coupled to the frame for rotation with respect to the frame, and a two-cylinder engine. The engine includes a housing, first and second cylinders having first and second combustion chambers, respectively, and first and second pistons mounted for reciprocal movement in the first and second chambers, respectively. The motorcycle further includes a spark generating circuit including a spark plug having a spark gap exposed to the first combustion chamber, an ion sensing circuit including the spark plug and being operable to generate an ion signal indicative of an ion current generated across the spark gap, and an analysis module coupled to the ion signal circuit. The analysis module is operable to receive the ion signal and to analyze the ion signal to determine whether a no-combustion event occurs in the first cylinder.

The invention also provides a method of determining whether a no-combustion event occurred in a two-cylinder engine of a motorcycle. The method includes the acts of providing a motorcycle, applying a spark-inducing signal to the spark generating circuit of the motorcycle, obtaining an ion signal indicative of an ion current across a first spark plug gap of the spark generating circuit; and analyzing the ion signal to determine if a no-combustion event resulted when applying the spark-inducing signal to the spark generating circuit.

The ion signal may be further analyzed to determine whether an intermittent connection may be present in the spark generating circuit. The intermittent connection results in a non-continuous current path and produces additional noise in the knock signal. For example, the intermittent connection may be a loose spark plug cable or a loose spark plug.

Accordingly, in yet another embodiment, the invention provides a vehicle (e.g., a motorcycle) including a frame, at least two wheels coupled to the frame for rotation with respect to the frame, and an engine. The engine includes a housing, a first cylinder having a first combustion chamber and a first piston reciprocating in the first chamber. The vehicle further includes a spark generating circuit including a spark plug and being operable to generate an ion signal indicative of an ion current generated across a spark gap, and an analysis module coupled to the ion signal circuit to determine if the spark generating circuit has an intermittent connection.

The invention also provides a method of determining whether a spark generating circuit of a vehicle has an intermittent connection. The method includes providing a vehicle having an engine, generating a spark in a combustion chamber of the engine with a first spark plug, obtaining an ion signal indicative of an ion current across the spark plug gap, and analyzing the ion signal to determine if the spark generating circuit has an intermittent connection.

Other features and advantages of the invention will become apparent to those skilled in the art upon review of the following detailed description, claims, and drawings.

Figure 1:
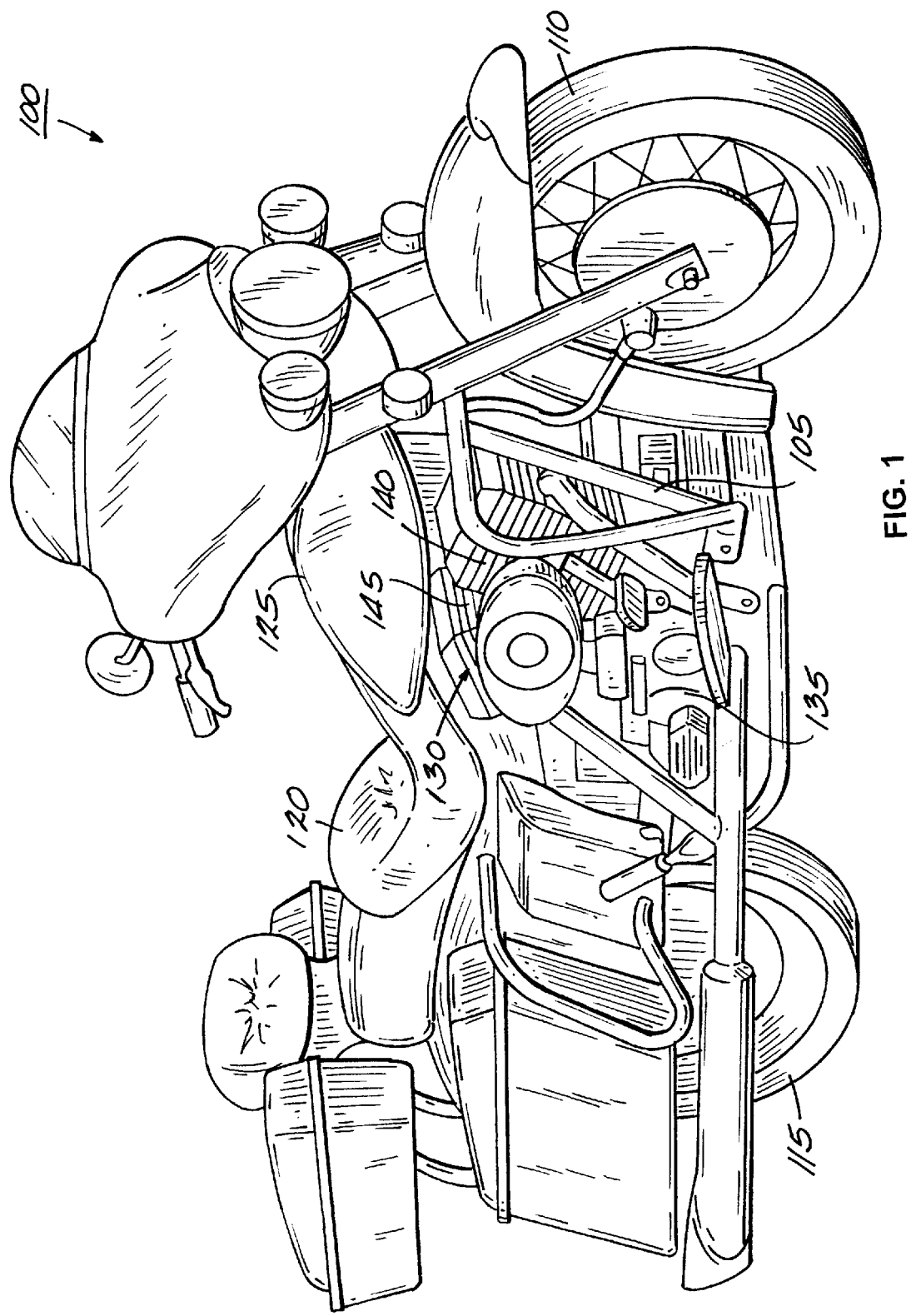
FIG. 1 is a perspective view of a motorcycle embodying the invention.

Before any embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

A motorcycle 100 embodying the invention is shown in FIG. 1. The motorcycle includes a frame 105, front and real wheels 110 and 115, a seat 120, a fuel tank 125, and an engine 130. The front and rear wheels 110 and 115 rotate with respect to the frame 105 and support the frame 105 above the ground. The engine 130 is mounted to the frame 105 and drives the rear wheel 115 through a transmission 135 and drive belt (not shown). The seat 120 and fuel tank 125 are also mounted to the frame 105. The engine 130 shown in FIG. 1 is a two cylinder, air-cooled, V-twin engine having first and second cylinders 140 and 145 (e.g., front and rear cylinders, respectively).

Figure 2:
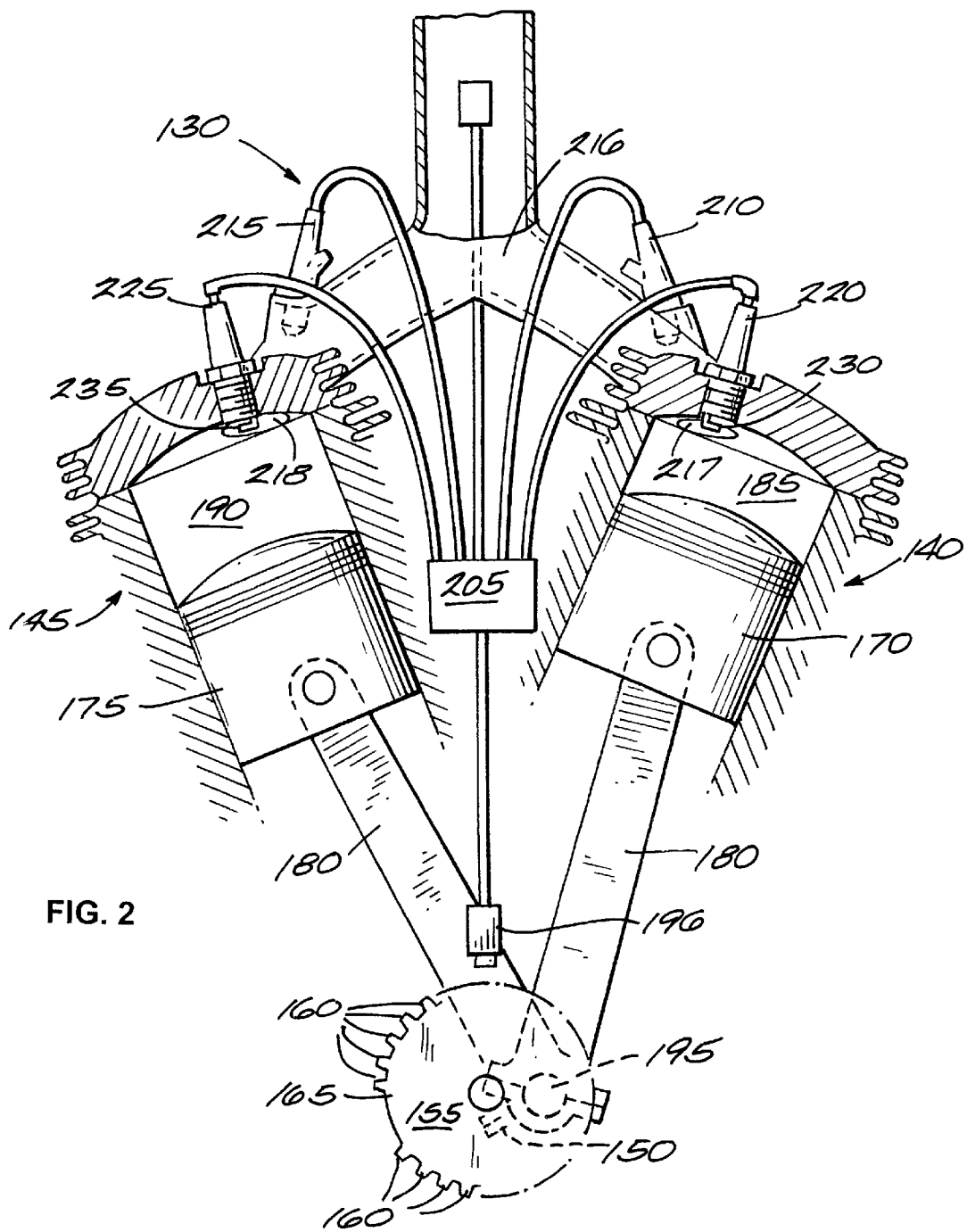
FIG. 2 is a schematic representation of a portion of the engine of the motorcycle illustrated in FIG. 1.

Referring to FIG. 2, the engine includes a crankshaft 150 having a crank gear 155 mounted thereto for rotation therewith. The illustrated crank gear 155 has teeth 160 sized and spaced to provide thirty-two teeth around the circumference of the crank gear 155. Two of the teeth have been removed, and provide a space on the crank gear 155. The space is referred to herein as an indicator 165. In this regard, the crank gear 155 includes thirty teeth 160 and the indicator 165 occupying the space where two additional teeth have been removed or not provided. Alternatively, the indicator 165 may be provided by an extra tooth on the crank gear or any other suitable device for indicating a specific location on the crankshaft.

The first and second cylinders 140 and 145 include first and second pistons 170 and 175, respectively, connected to the crankshaft 150 with connecting rods 180. The first and second cylinders 140 and 145 have first and second combustion chambers 185 and 190, respectively. The illustrated crankshaft 150 has a single crankpin 195 to which both of the connecting rods 180 are attached. A crankshaft velocity sensor 196 is mounted on the engine 130, preferably near the crank gear 155. The crankshaft velocity sensor 196 and crankshaft sensor circuitry 200 (schematically shown in FIG. 3) provide a crankshaft velocity signal to an analysis module 205. From the crankshaft velocity signal, the analysis module 205 is able to determine the location of the first and second pistons 170 and 175 within the first and second cylinders 140 and 145 and issue a crankshaft position signal corresponding thereto. For example, based on the crankshaft position signal, the processor may sense the location of the indicator 165 and count the teeth 160 to determine that the first piston 140 is at top-dead-center, while the second piston 145 is at some other position. An exemplary method for determining the location of the first and second pistons 170 and 175 in the first and second cylinders 140 and 145 is disclosed in U.S. patent application Ser. No. 09/620,014, entitled MOTORCYCLE HAVING SYSTEM FOR DETERMINING ENGINE PHASE, filed Jul. 20, 2000, the entire contents of which are incorporated herein by reference. Of course other sensors and/or methods can be used to determine the location of the first and second pistons 170 and 175 within the first and second cylinders 140 and 145.

The engine 130 further includes first and second fuel injectors 210 and 215 mounted on the engine near the first and second cylinders 140 and 145, respectively. The first fuel injector 210 injects fuel into an intake manifold 216 near a first intake valve 217 upon a signal being provided to the fuel injector 210. The first fuel injector signal is provided to the first fuel injector by first fuel injector circuitry 219 (FIG. 3) and is generated by the analysis module 205. Similarly, the second fuel injector 215 injects fuel into the intake manifold 216 near the second intake valve 218 upon a signal being provided to the second fuel injector 215. The second fuel injector signal is provided to second fuel injector circuitry 221 (FIG. 3) and is generated by the analysis module 205. The first and second fuel injectors 210 and 215, first and second fuel injector circuitry 219 and 221 are well known and will not be discussed in greater detail.

Figure 3:
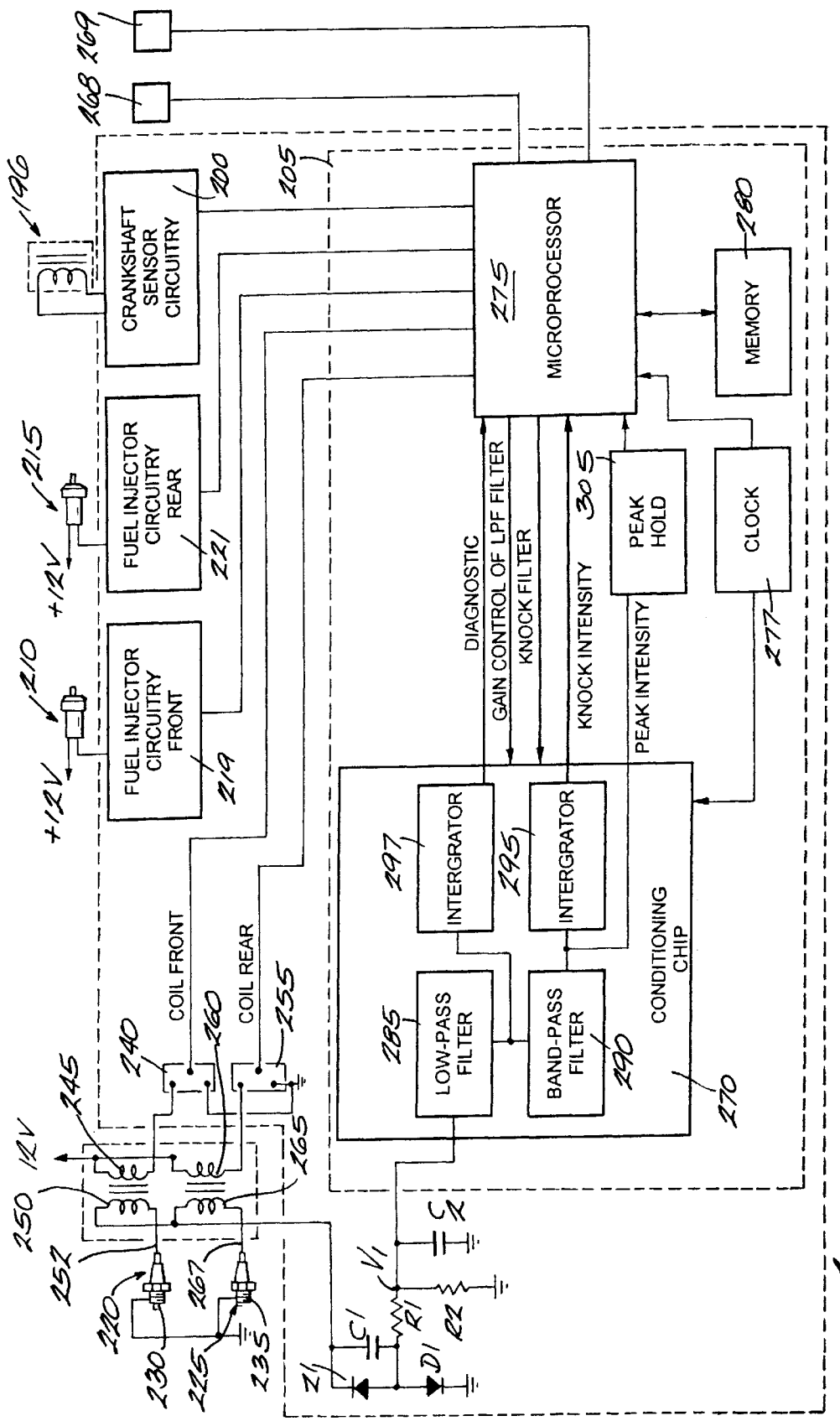
FIG. 3 is a schematic representation of the control circuit of the motorcycle illustrated in FIG. 1.

The engine 130 further includes first and second spark plugs 220 and 225 for the cylinders 140 and 145, respectively. The first and second plugs 220 and 225 include first and second spark gaps 230 and 235, respectively, exposed to the first and second chambers 185 and 190, respectively. Ideally, a first spark generating circuit creates a first spark signal that causes a first spark across the gap 230 in response to a first spark-inducing signal being generated by the analysis module 205. As shown in FIG. 3, the spark generating circuit includes first switch 240, first primary winding or coil 245, first secondary winding or coil 250, and the spark plug 220. The first secondary winding 250, the first spark plug 220, and a first spark plug cable 252 create a first ignition secondary circuit.

Similarly, a second spark is created across the second spark gap 235 when a second spark signal is applied to the second spark plug 225. The second spark signal is created by a second spark generating circuit, which includes second switch 255, second primary winding or coil 260, second secondary winding or coil 265, and the spark plug 225. The second secondary winding 265, the second spark plug 225 and a second spark plug cable 267 create a second ignition secondary circuit. The second spark is created in response to a second spark-inducing signal being generated by the analysis module 205.

Referring to FIG. 3, the motorcycle 100 further includes a first ion sensing circuit. The first ion sensing circuit includes first spark plug 220, first secondary coil 250, zener diode Z1, diode D1, capacitors C1 and C2, and resistors R1 and R2. The first ion sensing circuit generates a first ion signal at V1 having a relationship to the ion current created across the first spark gap 230.

The motorcycle 100 further includes a second ion sensing circuit. The second ion sensing circuit includes the second spark plug 225, the second secondary coil 265, the zener diode Z1, the diode D1, the capacitors C1 and C2, and the resistors R1 and R2. The second ion sensing circuit registers a second ion signal at V1 having a relationship to the ion current that is created across the second spark gap 235.

The motorcycle 100 further includes a means for determining whether knock is present within the first and second cylinders and a means for analyzing the ion signal for potential faults (e.g., a no-combustion event, an intermittent connection, etc.). The means for determining whether knock is present and the means for analyzing the ion signal can be fully implemented using any combination of an integrated circuit, a discrete circuit, or a microprocessor implementing a software program. As shown in FIG. 3, the means for determining whether knock is present and the means for analyzing the ion signal is an analysis module 205 having a combination of both an integrated circuit and a microprocessor 275.

The analysis module 205 includes a conditioning chip 270, a microprocessor 275, a clock 277, a peak hold memory 305, and a memory 280. The conditioning chip 270 includes a low-pass filter 285, a band-pass filter 290 and a first integrator 295, and a second integrator 297. The memory 280 includes memory for storing a knock detecting program and for storing data including knock intensity values. In addition, the memory 280 includes memory for storing a diagnostic program and for storing diagnostic faults. The microprocessor 275 includes an analog-to-digital (A/D) converter (not shown) for receiving signals from the conditioning chip 270 and the crankshaft sensor 200. The microprocessor 275 further includes a digital-to-analog (D/A) converter (not shown) for generating signals to the conditioning chip 270, the first and second spark generating circuits, the first and second fuel injectors 210 and 215. In addition, the microprocessor 275 receives the software program of the invention from memory 280 and implements it accordingly.

The motorcycle 100 further includes a visual display or interface 268 connected to microprocessor 275 for communicating information (e.g., motorcycle speed, engine speed, amount of fuel potential failures, etc.) to the user. The visual display 268 may include one or more gauges, lights, LEDs, and similar visual display devices. The motorcycle 100 includes a terminal or output port 269 allowing a technician or mechanic to communicate with the analysis module 205.

The motorcycle 100 may further include additional engine sensors not shown in the figures. For example, the motorcycle may include an engine temperature sensor and/or a manifold air-pressure sensor. Since these sensors are well-known in the art, they will not be discussed in detail.

In operation, the microprocessor 275 executes a software program that interacts with the engine 130 to implement the invention. The software instructs the microprocessor 275 to separately control the first and second fuel injectors 210 and 215, to separately control the first and second spark plugs 220 and 225 for providing combustion in the engine 130. However, because the combustion of each cylinder 140 or 145 is similar, only the combustion of the first cylinder 140 will be discussed in detail.

Figures 4, 4A:
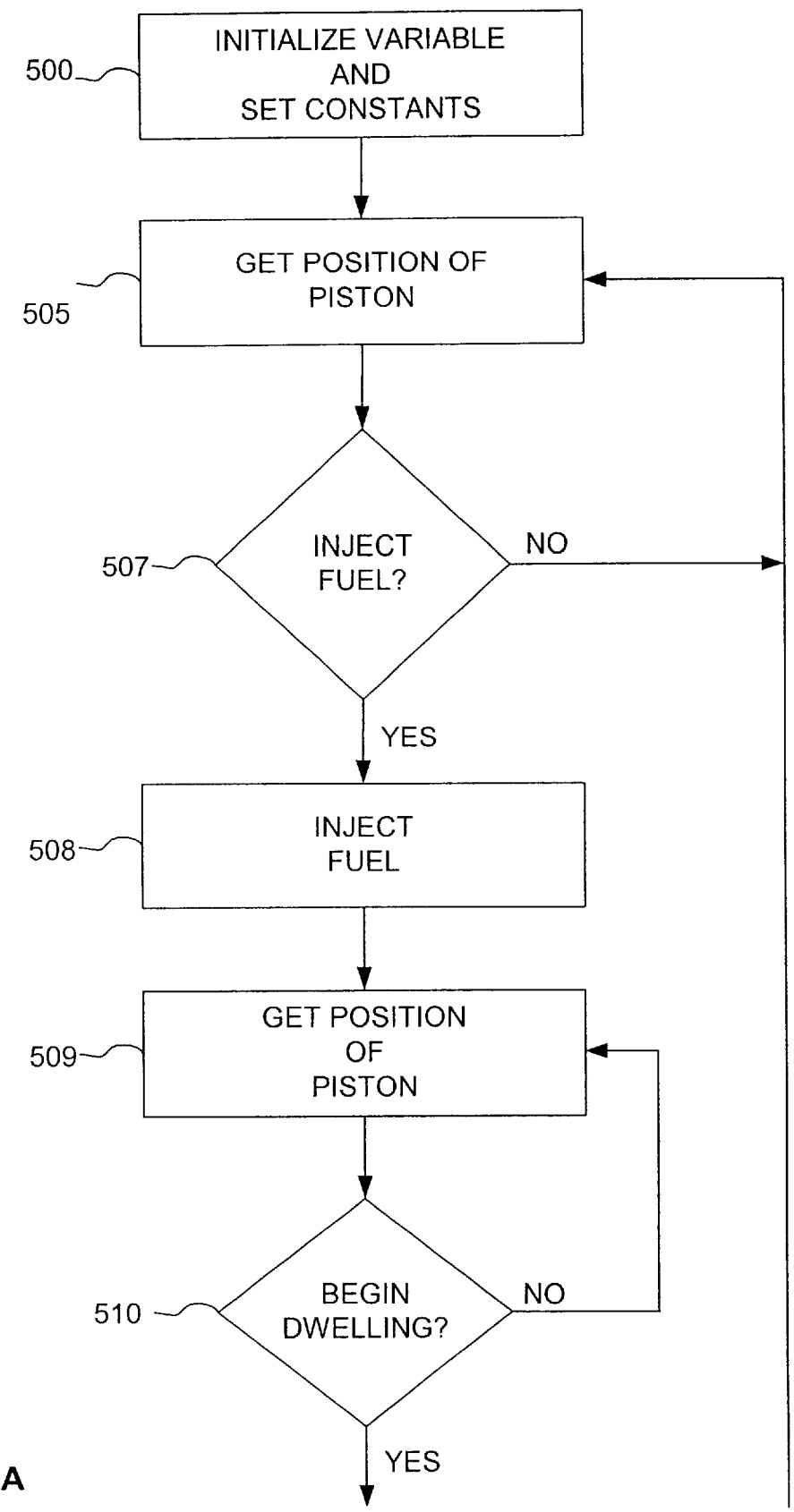
FIG. 4 is a flow chart implementing one embodiment of a method of generating a spark event in a cylinder and analyzing an ion signal in the cylinder.
Figure 4B:
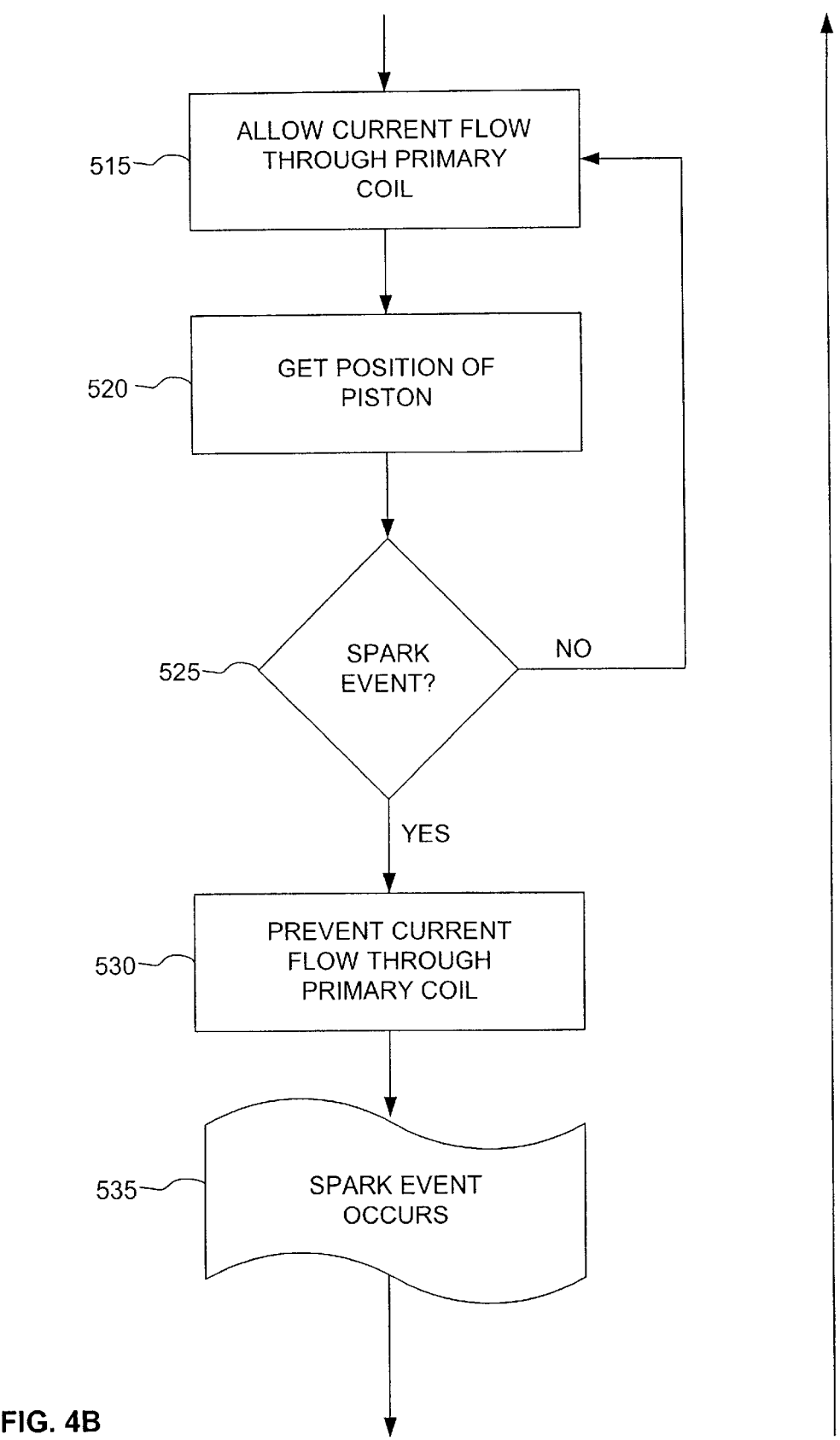

The various acts that make up the method will now be described with reference to FIG. 4. At act 500, the microprocessor 275 initializes variables to initial values and sets constant values to their respective values. For example, the software maintains a variable for when the spark event occurs. The spark event variable may be set to an initial value (e.g., spark at 5 degrees before top-dead-center in the compression stroke). Other variables are similarly initialized.

At act 505, the microprocessor 275 determines the position of the first piston 170 within the cylinder 140. Preferably, the microprocessor 275 determines the first piston position by sampling the crankshaft velocity signal generated by the crankshaft sensor 196. The crankshaft velocity signal is then used to calculate the first piston position as is disclosed in U.S. patent application Ser. No. 09/620,014, which is incorporated herein by reference. Of course other methods for determining the location of the first piston can be used.

At act 507, the microprocessor 275 determines whether to inject an amount of fuel within the combustion chamber 185. The injection of the fuel begins at a calculated time period before the sparking event. If the position of piston 170 is before the location optimal for injecting the fuel, then the software returns to act 505. However, if the position of piston 170 is at or after the location optimal for injecting fuel, then the microprocessor 275 injects the fuel (act 508).

The amount of fuel for injection has either been set when the microprocessor initialized the variables (act 500) or was calculated at act 610 (discussed below). The method of injecting the fuel can be by any known method as long as the total amount of fuel is properly injected.

At act 509, the microprocessor 275 again determines the position of the first piston 170. The method of determining the position of the first piston 170 is similar to act 505.

At act 510, the microprocessor 275 determines whether to begin dwelling or storing energy within the ignition coil 245. The dwelling event begins at a calculated time period before the sparking event. Some of the parameters that are included when calculating the dwelling event include the amount of energy needed to allow the spark event to occur, the voltage of the battery, the engine speed, and similar criteria. If the position of piston 170 is before the location of when the dwelling event begins, the microprocessor 275 returns to act 509. However, if the position of piston 170 is at or after the location of when the dwelling event begins, the microprocessor 275 proceeds to store energy within the ignition coil (act 515).

At act 515, the microprocessor 275 provides a dwell signal to the first switch 240 of the spark generating circuit. By providing the dwell signal, a current is allowed to flow from the twelve-volt power source through the primary ignition coil 245 to ground. The current flow through the primary ignition coil 245 results in energy being stored within the primary ignition coil 245.

At act 520, the microprocessor 275 again determines the position of the first piston 170. The method of determining the position of the first piston 170 is similar to act 505.

At act 525, the microprocessor 275 determines whether to fire the spark plug 220. Specifically, the software determines whether the piston 170 is at the proper position to have the spark event occur. The position for the spark event has either been set when the microprocessor 275 initialized the variables (act 500) or was calculated at act 605 or 607 (discussed below). If the position of the piston 170 is before the location of the spark event, then the software returns to act 515. If the position of the piston 170 is at or after the location of when the sparking event occurs (e.g., five degrees before top-dead-center in the compression stroke), then the microprocessor 275 proceeds to act 530.

At act 530, the microprocessor 275 stops providing a signal to the first switch 240. By removing the signal, the energy stored within the primary of the ignition coil 245 is transferred to the secondary. Ideally, the energy creates a current that flows from the secondary coil 250, to the spark-plug cable 252, to the spark plug 220, through the spark gap 230 to ground. The current flow through the spark gap creates a spark (act 535) resulting in combustion. In other words, at act 530, the microprocessor 275 provides a spark-inducing signal to the spark generating circuit, resulting in a combustion within the cylinder 140.

After the occurrence of the spark event (act 535), the piston 170 continues to move within the cylinder 140. The resulting spark event (act 535) and the continued movement of the piston 170 results in an increased pressure within the combustion chamber 185. The increased pressure ionizes the gases within the cylinder 140 (act 540). Referring to FIG. 3, the ions or negative charge results in an ion current that flows from the spark gap 230 through the secondary coil 250, through capacitor C1, through resistor R1, and the parallel path of resistor R2 and capacitor C2. The zener diode Z1 biases the ion current across the spark gap 230 with an eighty-volt direct-current (DC) signal. The capacitor C1 stores the eighty-volt bias voltage. Resistor R1 and R2 and capacitor C2 create a voltage divider and filter resulting in an ion signal being created at point V1. The ion signal V1 corresponds to the ion current that is created across the spark gap (act 545). The ion signal is provided to the analysis module 205 for analysis.

The conditioning chip 270 receives the signal from the ion sensing circuit and conditions the ion signal to create a diagnostic signal, a knock intensity signal, and a peak hold signal. At act 550, the conditioning chip 270 applies the ion signal to the low-pass filter 285 to remove high frequency noise. The resulting signal is integrated by the second integration 297 over a combustion analysis window, which produces a diagnostic signal. The diagnostic signal is provided to the microprocessor 275 (act 555). The microprocessor 275 determines whether to enable the knock control portion of the software (act 560).

Figure 5:
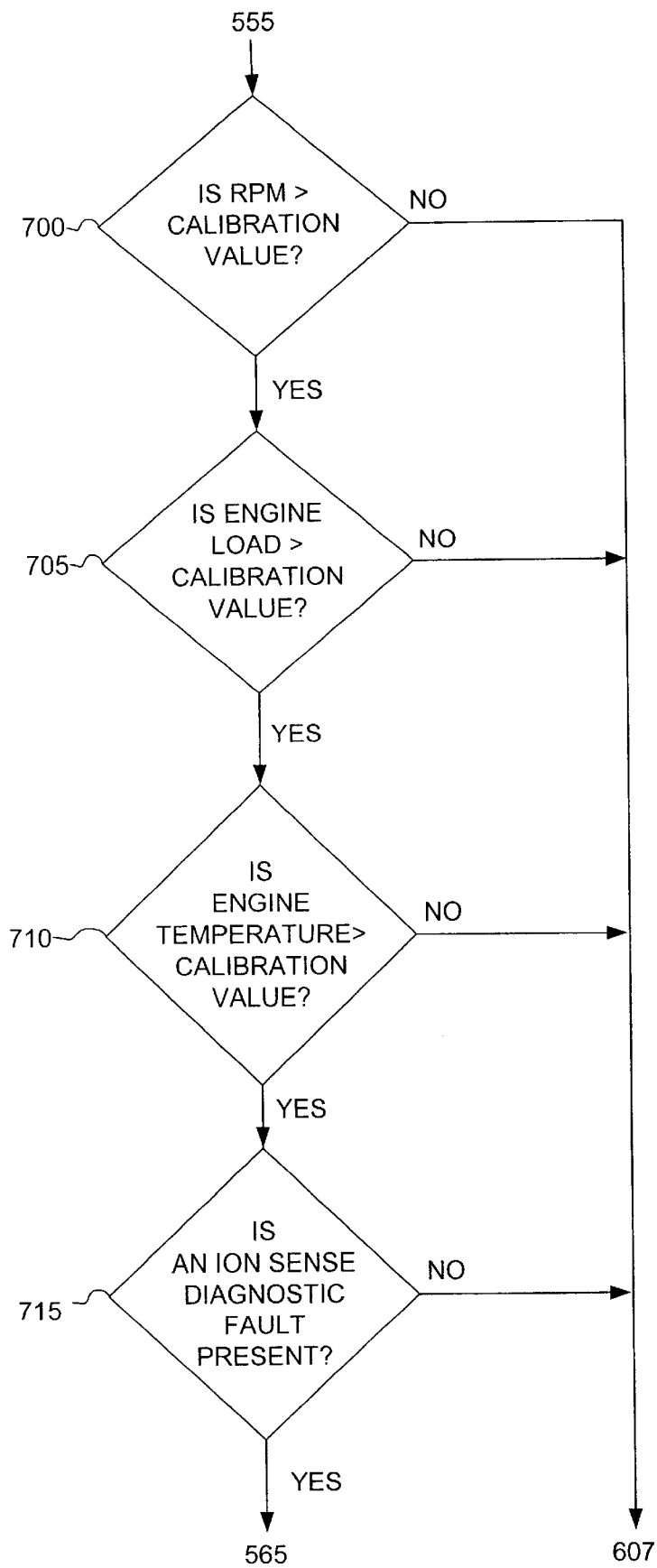
FIG. 5 is a flow chart implementing the act of enabling the knock control logic.

Act 560 is illustrated in more detail in FIG. 5. At act 700, the software calculates a current engine running speed (RPM) (e.g., from the crankshaft velocity sensor 196) and compares the current engine running speed with a minimum knock RPM calibration value. The knock RPM calibration value is the minimum RPM value required to implement the knock control portion of the program. If the current engine running speed is greater than the knock RPM calibration value, then the software precedes to act 705. However, if the calculated RPM value is less than or equal to the minimum knock RPM calibration value then the software proceeds to act 607.

At act 705, the software calculates an engine load value (e.g., from a manifold-air pressure sensor) representing the load or the amount of force restricting the engine 130 from driving the wheel 115. The software compares the engine load value with a minimum knock engine load calibration value. The knock engine load calibration value is the minimum load value required to implement the knock control portion of the program. If the engine load value is greater than the knock calibration engine load value, then the software precedes to act 710. However, if the engine load value is less than or equal to the knock calibration load value, then the software proceeds to act 607.

At act 710, the microprocessor 275 obtains an engine temperature value (e.g., from an engine temperature sensor) and compares the engine temperature value with a minimum knock engine temperature calibration value. The knock engine temperature calibration value is the minimum engine temperature required to implement the knock control portion of the program. If the engine temperature value is greater than the knock calibration engine temperature value, then the software precedes to act 715. However, if the engine temperature value is less then or equal to the knock calibration engine temperature value then the software proceeds to act 607.

Figure 7A:
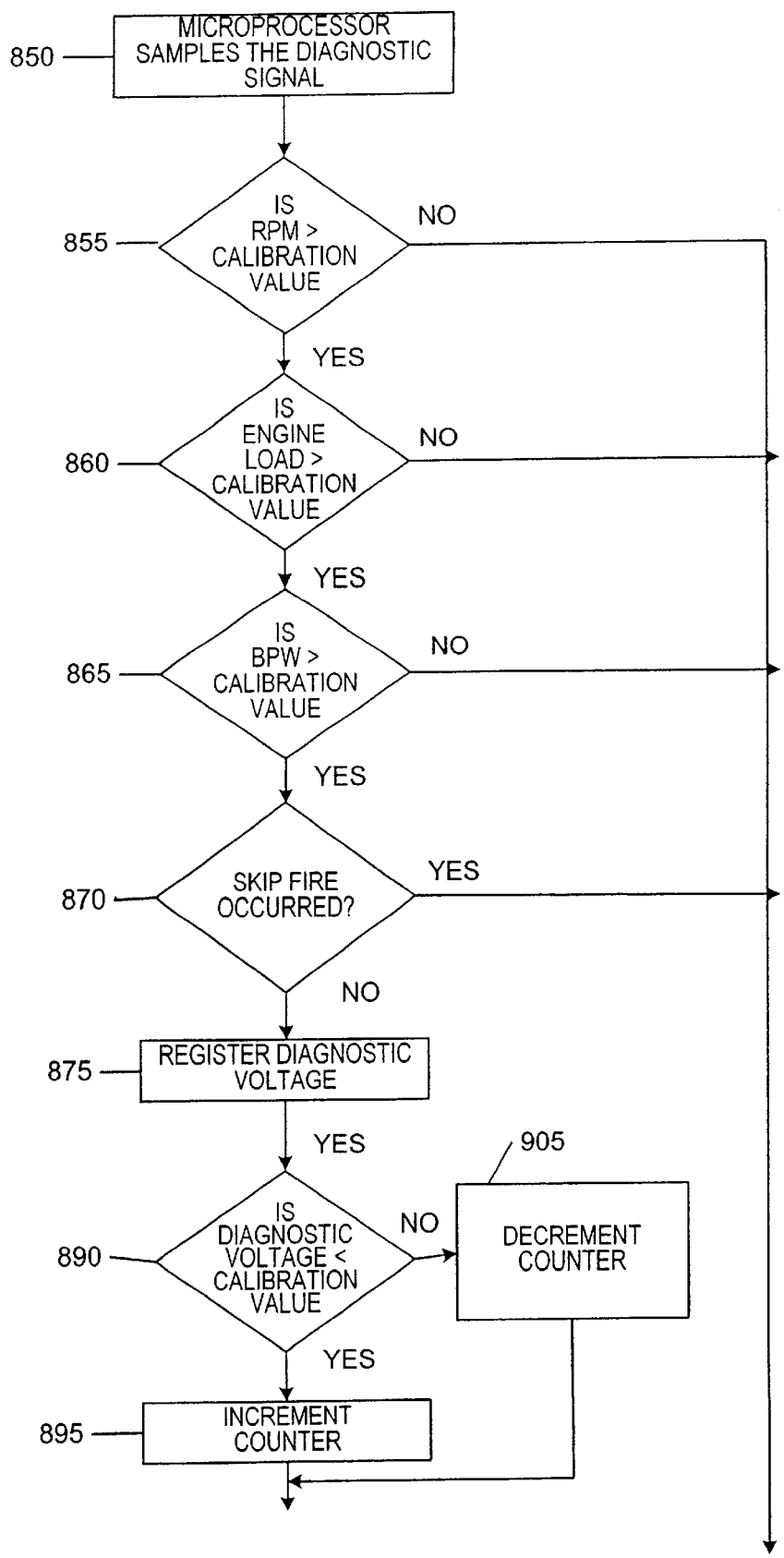
FIG. 7 is a flow chart implementing one embodiment of a method of generating a no-combustion diagnostic fault.
Figure 7B:
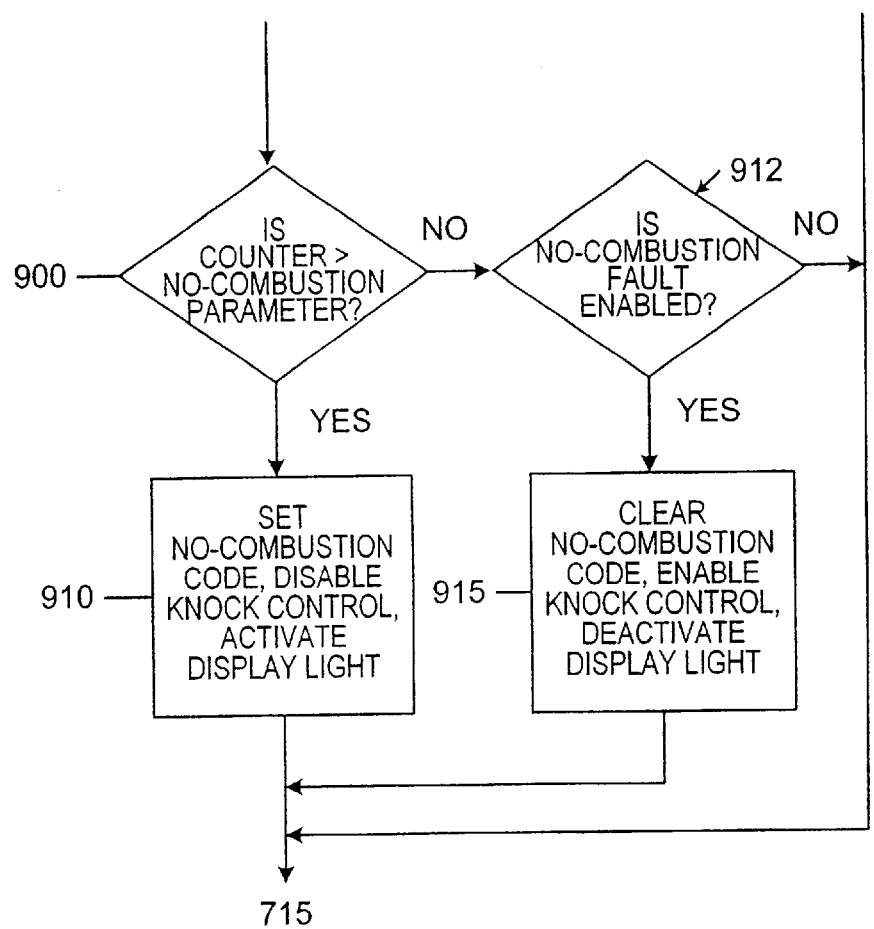

At act 715, the microprocessor 275 analyzes the diagnostic signal to determine whether a no-combustion diagnostic fault or code is present. The software determines from the diagnostic signal whether the combustion event has occurred. If the software determines that the combustion event has not occurred, then the software does not perform knock control and proceeds to act 607. However, if no diagnostic fault is present, the software proceeds to act 565 which enables the knock control portion of the software. If enough no-combustion events occur, then the software generates a no-combustion diagnostic code and disables the knock control. One method of generating a no-combustion diagnostic code is shown in FIG. 7.

At act 850, the diagnostic signal is provided to the microprocessor 275, where the microprocessor 275 samples the diagnostic signal. Although the microprocessor analyzes the ion current in both the first and second cylinders 140 and 145, only the first cylinder 140 will be discussed in detail.

At act 855, the software calculates a current engine running speed (RPM) (e.g., from the crankshaft velocity sensor 196) and compares the current engine running speed with a minimum no-combustion RPM calibration value. The software may use the previous calculated speed from act 700, or may calculate a new speed. The no-combustion RPM calibration value is the minimum RPM value required to implement the combustion analysis portion of the program. If the current engine running speed is greater than the minimum combustion calibration value (e.g., 2000 RPMs), then the software precedes to act 860. However, if the calculated RPM value is less then or equal to the no-combustion RPM calibration value then the software returns to act 715.

At act 860, the software calculates an engine load value (e.g., from a manifold air-pressure sensor) representing the load or the amount of force restricting the engine 130 from driving the wheel 115. The software may use the previous calculated engine load from act 705, or may calculate a new engine load. The software compares the engine load value with a minimum no-combustion engine load calibration value (e.g., 54.9 kPa). If the manifold air-pressure is too low, then the manifold pressure is not great enough to properly disperse a fluid within the cylinder. The no-combustion engine load calibration value is the minimum load value required to implement the combustion analysis portion of the program. If the engine load value is greater than the no-combustion engine load calibration value, then the software precedes to act 865. However, if the engine load value is less than or equal to the no-combustion engine load calibration value then the software returns to act 715.

At act 865, the software determines whether a fuel base pulse width is greater than a minimum fuel base pulse width calibration value. The fuel base pulse width is proportional to the amount of fuel being delivered to the first combustion chamber 145. If the amount of fuel is low (e.g., due to a low running speed), then combustion sufficient to meet the requirements for no-combustion analysis may not be met. If the fuel base pulse width is greater than the fuel base pulse width calibration value, then the software precedes to act 870. However, if the fuel base pulse width is less then or equal to the fuel base pulse width calibration value, then the software returns to act 715.

At act 870, the software determines whether a "skip fire" has occurred. Under certain conditions (e.g., the engine is too hot), the microprocessor 275 may intentionally skip a fire or spark condition. The software does not register the signals for this condition. If a skip fire has not occurred, then the software proceeds to act 875. However, if a skip fire has occurred, then the software returns to act 715. Although acts 855–870 were described in a particular order, the order of acts 855–870 may vary. In addition, other enable conditions may be used and not all conditions may be required.

The software then analyzes the obtained diagnostic signal (act 875) to determine whether a combustion event has occurred. For the analysis, the software determines whether the diagnostic signal voltage for the combustion analysis window is less than a diagnostic calibration value. For example, the sampled diagnostic voltage may be between 0-VDC and 5-VDC, and the diagnostic calibration value may be 150 mVDC. The diagnostic calibration value varies depending on how sensitive the manufacturer wants to register possible no-combustion events. If at the end of the combustion analysis window the integrated diagnostic voltage is less than the diagnostic calibration value (act 890), then the software determines a "no-combustion" event has occurred. If a no-combustion event has occurred, then the software increments a no-combustion event counter (act 895) and proceeds to act 900. Otherwise, at act 905, the software decrements the no-combustion event counter (if greater than zero) and proceeds to act 910.

At act 900, the software determines whether the no-combustion event counter is greater than a no-combustion parameter. If the combustion event counter is greater than the no-combustion parameter, then the software sets the no-combustion code of the associated cylinder as being true (act 905). In addition, the software disables the knock control portion of the software, and activates a display light 268 informing the operator that the motorcycle 100 needs to be serviced. A technician may communicate with the microprocessor 275 via terminal 269 when servicing the motorcycle. The technician retrieves the code, which informs the technician that one of the chambers is not producing combustion. Based on the code, the technician looks for specific engine problems (e.g., a spark plug is malfunctioning, a spark plug cable is unhooked, an error is occurring with the fuel system, etc.). Upon servicing the engine, the technician may reset the counter and the code.

The software may continue to look for combustion within the chamber by continuously analyzing the no-combustion counter. If the number of events has decreased under the no-combustion parameter (act 900), then the software will clear the current diagnostic code and enable knock control (acts 912 and 915).

Figure 4C:
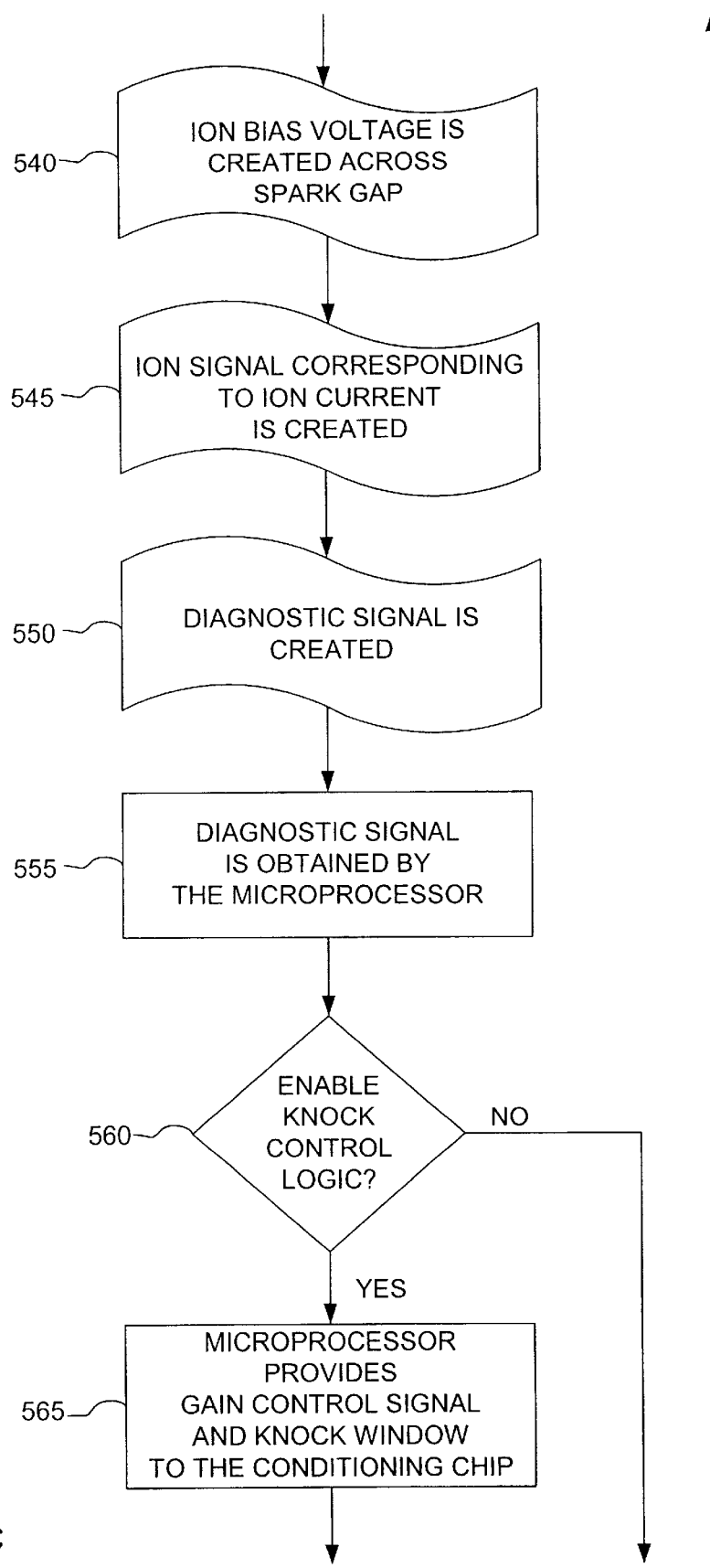

Referring back to FIG. 4c, at act 565, the microprocessor 275 provides a gain control signal to the conditioning chip 270 for setting the gain of the low-pass filter 285. The gain control signal sets the background noise and is based in part on the diagnostic signal. If the software determines that the diagnostic signal is not properly within an expected voltage range, then the microprocessor 275 will set the gain control signal accordingly. In addition, at act 565, the software provides a knock window to the conditioning chip 270. The knock window is calculated by the software program and is based on a number of variables including RPM, engine load, and spark timing. The knock window is provided to the integrator 295 and is the "window" used by the integrator to obtain an integrated value (i.e., the knock intensity value, discussed below). It should be understood that the gain control signal and the knock intensity signal can be continuously provided to the conditioning chip 270 throughout the implementation of the software program.

Figure 4D:
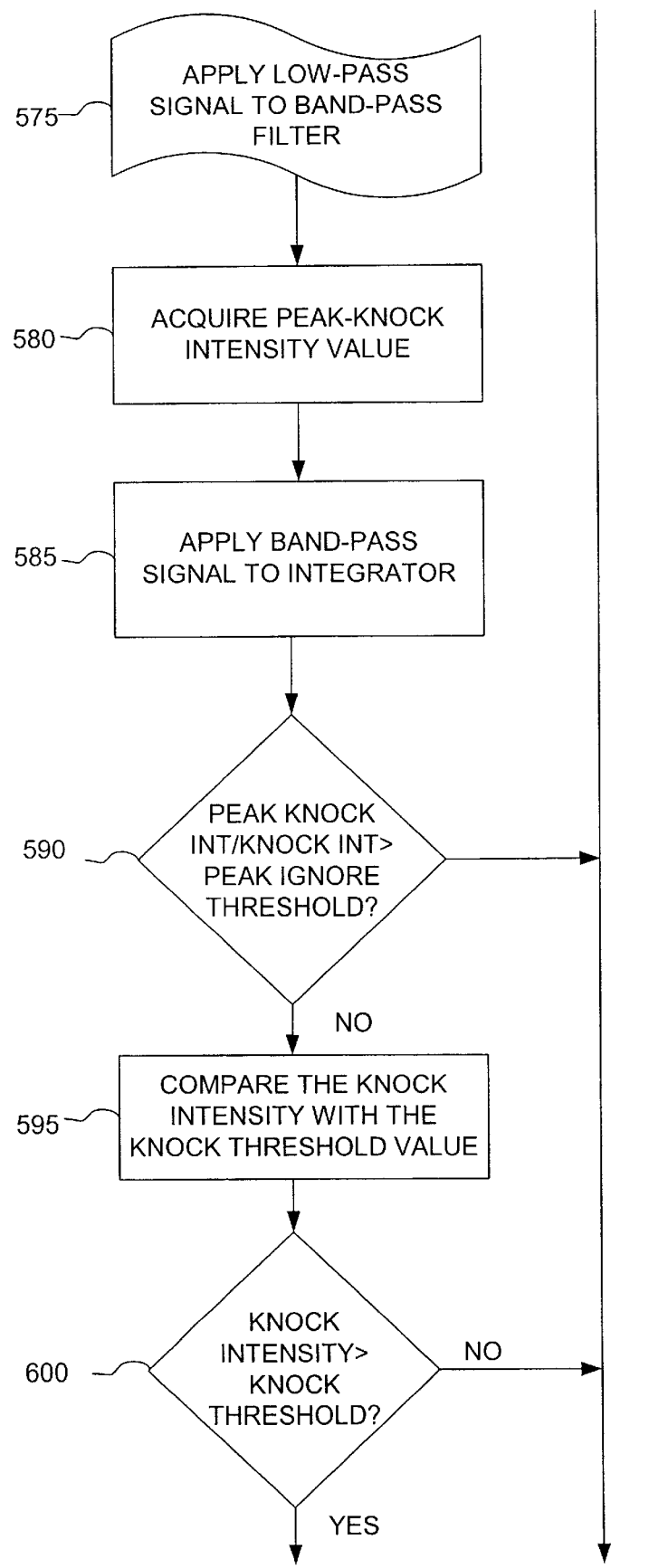
Figure 6A:
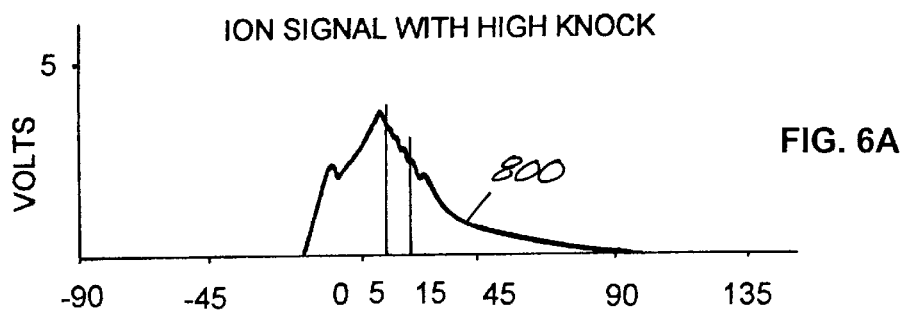
FIGS. 6a–6d are sample voltage vs. crank angle graphs of the ion signal and of the band-pass signal.
Figure 6B:
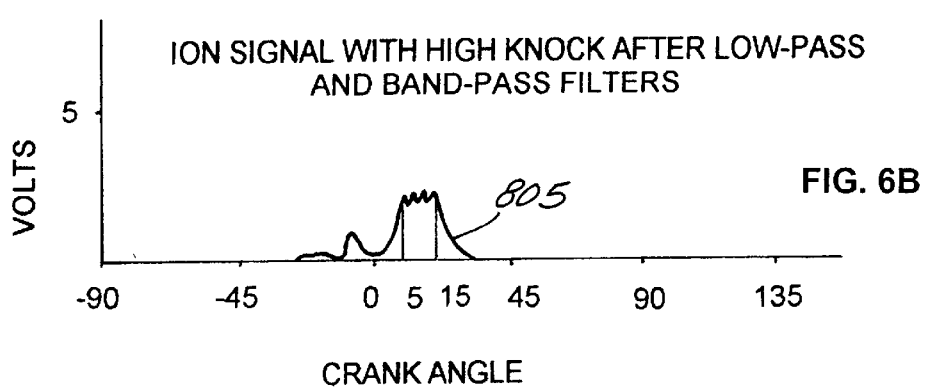
Figure 6C:
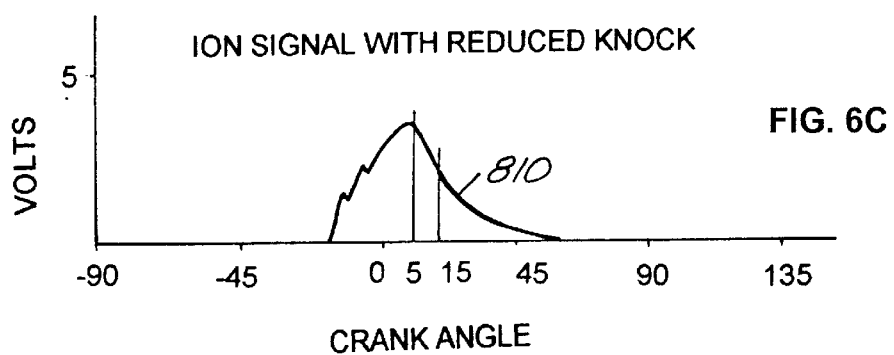
Figure 6D:
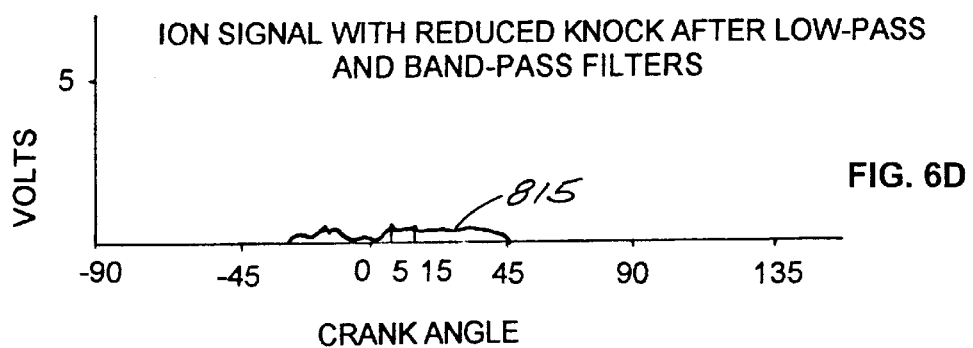

At act 575 (FIG. 4d), the conditioning chip 270 applies the signal resulting from the low-pass filter 285 to a band-pass filter 290. The band-pass filter 290 passes a band-pass signal having frequencies within a frequency range. The frequency range is the expected knock frequency of a knock portion in the ion signal. For example, FIG. 6a shows a first ion signal 800 including a knock portion having high knock. After being applied to the low-pass filter 285 and the band pass filter 290, the first ion signal 800 results in a first band-pass signal 805 (shown in FIG. 6b). FIG. 6c shows a second ion signal 810 having a knock portion with little or no knock. After being applied to the low-pass filter 285 and the band pass filter 290, the second ion signal 810 results in a second band-pass signal 815 (shown in FIG. 6d). As can be seen from FIGS. 6a through 6d, the resulting band-pass signals 805 and 815 vary depending on the amount of knock within the ion signal.

Referring back to FIG. 4d, at act 580, the resulting band-pass signal is provided to a peak-hold detector 305. The peak-hold detector 305 obtains a peak-knock intensity value. The peak-knock intensity value is provided to the microprocessor 275 and is used by the microprocessor 275 to determine whether the ion signal contains noise spikes (discussed below). If noise spikes are present, the cause of the noise spikes may be due to an intermittent connection in the spark generating circuit (e.g., a loose spark plug cable).

At act 585, the resulting signal from the band-pass filter 290 is applied to an integrator 295. The integrator 295 integrates the energy of the applied signal over the knock window resulting in a knock intensity signal having a knock intensity value. The knock intensity value represents the amount of knock energy within the ion signal. For the examples shown in FIGS. 6a and 6b, the knock window is between 5 degrees and 15 degrees after top-dead-center.

At act 590 (FIG. 4d), the software calculates a peak ignore threshold value which may be a predetermined value or can be a value calculated as a function of engine speed (RPM) and average knock intensity of previous sparking events. The software then compares a ratio of the peak-knock intensity and the knock intensity value with the peak ignore threshold (act 590). If the software determines that the ratio is greater than the peak ignore threshold, then the ion signal contains noise spikes and the microprocessor 275 will not record the knock intensity for the current spark event (i.e., proceeds to act 607). If the microprocessor 275 determines that the ratio is less than or equal to the peak ignore threshold, then the software determines that the ion signal does not contain noise spikes and proceeds to act 595.

In addition, the software may determine whether the noise spikes are due to an intermittent connection (e.g., a loose spark plug or a loose spark plug cable). A method for determining whether the noise spikes of the ion signal signifies an intermittent connection is shown in FIG. 8.

Figure 8:
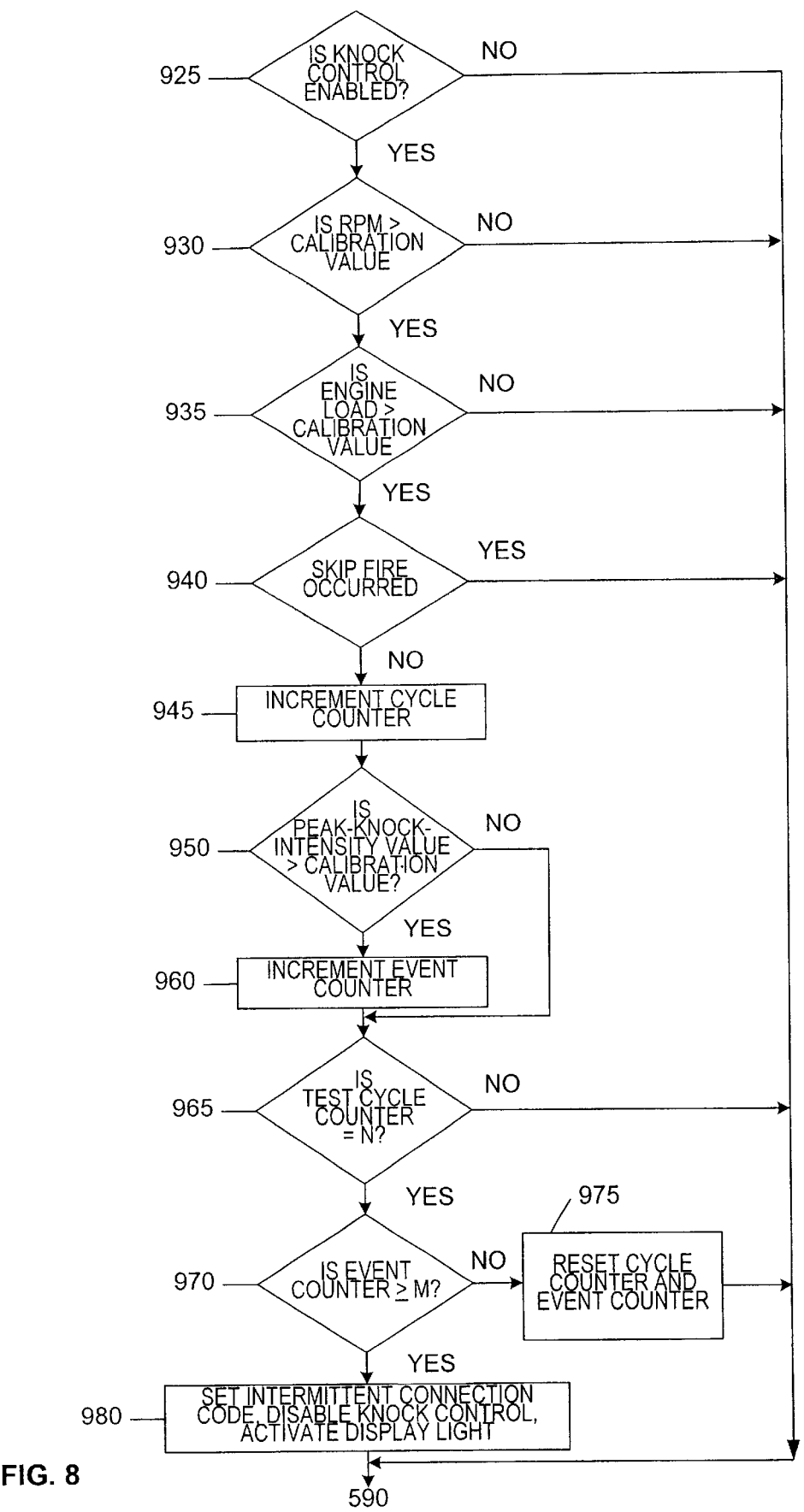
FIG. 8 is a flow chart implementing one embodiment of a method of analyzing an ion signal to determine if the spark generating circuit includes an intermittent connection.

As shown in FIG. 8 and at act 925, the software determines whether knock control is currently enabled. If a knock control is enabled, then the software proceeds to act 930. However, if knock control is not enabled, then the received knock signal may not properly signify a true knock signal and the software returns to act 590.

At act 930, the software calculates a current engine running speed (RPM) (e.g., from the crankshaft velocity sensor 196) and compares the current engine running speed with a minimum intermittent-connection RPM calibration value. The software may use the previously calculated speed from acts 700 or 855, or may calculate a new speed. The intermittent-connection RPM calibration value is the minimum RPM value required to implement the intermittent-connection analysis portion of the program. If the current engine running speed is greater than the intermittent-connection calibration value (e.g., 2000 RPMs), then the software precedes to act 935. However, if the calculated RPM value is less than or equal to the intermittent-connection RPM calibration value, then the software returns to act 590.

At act 935, the software calculates an engine load value (e.g., from a manifold air-pressure sensor) representing the load or the amount of force restricting the engine 130 from driving the wheel 115. The software may use the previous calculated engine load from acts 705 or 860, or may calculate a new engine load. The software compares the engine load value with a minimum intermittent-connection engine load calibration value. If the manifold air-pressure is too low, then the manifold pressure is not great enough to properly disperse a fluid within the cylinder. The intermittent-connection engine load calibration value is the minimum load value required to implement the intermittent-connection analysis portion of the program. If the engine load value is greater than the intermittent-connection engine load calibration value, then the software proceeds to act 940. However, if the engine load value is less then or equal to the minimum calibration load value, then the software returns to act 590.

At act 940, the software determines whether a "skip fire" has occurred. Under certain conditions (e.g., the engine is too hot), the microprocessor 275 may intentionally skip a fire or spark condition. The software does not register the signals for this condition. If a skip fire has not occurred, then the software proceeds to act 945. However, if a skip fire has occurred, then the software returns to act 590. Although the acts 930, 935 and 940 were described in a particular order, the order of the acts 930, 935 and 940 may vary. In addition, other enable conditions may be used and not all acts 930, 935 and 940 may be required.

The software then determines whether an intermittent connection is present in the spark generating circuit. An intermittent connection usually results in a combustion event, but due to the intermittent or loose connection, the combustion will not be a full combustion. This will result in noise "spikes" within the knock signal that are greater than the noise signifying knock. Since the connection is intermittent, the resulting intermittent-connection noise spikes may not occur during every combustion event for the chamber. Therefore, for the embodiment described, the software analyzes (n) (e.g., n=100) consecutive events where the enable conditions are met, and determines whether (m) (e.g., m=30) of the combustion events result in noise spikes signifying an intermittent connection. The values of (n) and (m) may vary depending on the engine used and the manufacture's tolerance levels.

For one specific example method, at act 945, the software increases a test-cycle counter. At act 950, the software determines whether the peak-knock-intensity voltage for the knock window is greater than a minimum peak-knock-intensity calibration value signifying an intermittent connection. For example, if the voltage of the peak-knock-intensity signal is between zero and five volts d.c. ("VDC"), then the minimum peak-knock-intensity calibration value signifying an intermittent connection may be 4 VDC. If the peak-knock-intensity voltage for the knock window is greater than the peak-knock-intensity calibration value, then the software increments the event counter (act 960).

At act 965, the software determines whether the test-cycle counter is equal to (n) signifying the completion of the test. If the test-cycle counter is equal to (n), then the software proceeds to act 970. However, if the test-cycle counter is less than (n), then the software proceeds to act 595.

At act 970, the software determines whether the event counter is equal to or greater than (m), which signifies an intermittent connection. If the number of events is less than (m), then the software determines the spark generating circuit does not have an intermittent connection and resets both counters (act 975). If the number of events is equal to or greater than (m), then the software determines the spark generating circuit has an intermittent connection. The software disables knock control for both cylinders (act 980) and enables an intermittent-connection code. The software disables knock control for both cylinders since proper knock detection is not possible when an intermittent fault is detected.

In addition, a display light 268 may activate informing the operator that the motorcycle 100 needs to be serviced. A technician may communicate with the microprocessor 275 via terminal 269 when servicing the motorcycle 100. The technician retrieves the intermittent-connection code, which informs the technician that one of the spark generating circuits has an intermittent connection. Based on the code, the technician may look for specific engine problems (e.g., the spark-plug cable, the spark plug is loose a bent spark-plug terminal, etc.).

Returning back to FIG. 4*d*, at act 595, the software compares the knock intensity value with a knock threshold value. The knock threshold value can be a predetermined constant or can be a continuously calculated value for each spark event. For example, the knock threshold value can be a function of a running average of previously recorded knock intensity values and engine speed (RPM). If the knock intensity value is greater than the knock threshold value (act 600), then the software determines knock is present. Conversely, if the knock intensity value is equal to or less than the knock threshold value (act 600), then the microprocessor determines knock is not present. Of course, if the microprocessor has recorded a history of knock values, then the microprocessor may require multiple "knock confirmations" before determining knock is present. By requiring multiple knock confirmations, the software allows for an occasional unexpected spikes due to combustion variance.

Figure 4E:
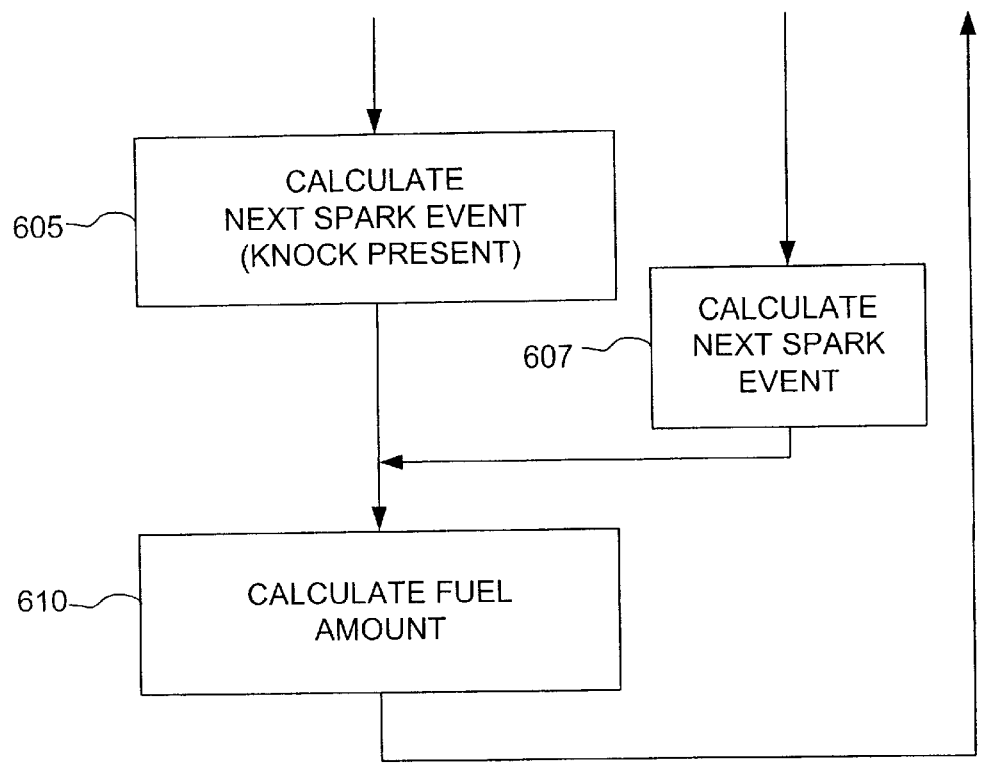

At act 605 (FIG. 4*e*), if knock is present, the software calculates a piston position for the next spark event. The new spark event position can be calculated by various different methods. One method has the microprocessor "retard" the event by a predetermined number of degrees. A second and more preferable method has the microprocessor retard the spark event by a non-predetermined number of degrees. For the second method, the software can calculate a new spark event position with one of the variables being the amount of knock greater than the threshold value. For example, if the knock value is greater than the threshold value by (×1), then the spark event may be retarded by two degrees. Alternatively, if the knock value is greater than the threshold value by (×2), then the spark event may be retarded by four degrees. Even further, the software may implement an equation for determining the timing at new spark event with one of the variables being the difference between the knock value and the threshold value.

In addition, the software continues to retard the spark event until the knock has ceased, or until the spark event position is at a maximum spark event position. If the software determines that knock is not present, then the software slowly returns the spark event position to its original spark event position (act 607). Alternatively, once the knock has ceased, the software can abruptly return the spark event back to its original spark event position (act 607). The motivation for returning the spark event back to its original position as quickly as possible is that retarding the spark event causes the engine to lose power. By returning the spark event back to normal, the engine can provide its maximum amount of power for the engine speed.

At act 610, the software calculates an amount of fuel for the next spark event. If the spark event position is at a max spark event position, then the amount of fuel for the next spark event is increased. Increasing the amount of fuel is typically referred to as fuel enriching. By adding more fuel to the combustion chamber 185, the excess fuel does not entirely combust, and heat from the combustion chamber 185 is transferred to the uncombusted fuel. When the excess fuel exhausts, some of the heat within the chamber 185 exhausts with the fuel. This results in the chamber 185 running at a cooler temperature and, consequently, reducing the susceptibility for knock within the cylinder 140. In addition, adding excessive fuel reduces exhaust temperatures that in some engines are increased by retarding spark. Similar to calculating the new spark event position, the new amount of fuel can be a predetermined amount or can be calculated by the software. Of course, although the amount of fuel preferably varies after the spark event position is at a max spark event position, the software can vary the spark event timing and the amount of fuel concurrently.

After act 610, the software returns to act 505 and initiates the next combustion event. Of course, the software performs additional acts normal to the combustion process which are not shown (e.g., exhausting the combustion chamber).

As can be seen from the above, the present invention provides a motorcycle having a system for combustion knock control. Various features and advantages of the invention are set forth in the following claims.

What is claimed is:

1. A motorcycle comprising:
   a frame;
   front and rear wheels coupled to the frame for rotation with respect to the frame;
   an engine including a housing, first and second cylinders having first and second combustion chambers, respectively, and first and second pistons reciprocating in the first and second chambers, respectively;
   a spark generating circuit including a spark plug having a spark gap exposed to the first combustion chamber;
   an ion sensing circuit including the spark plug and being operable to generate an ion signal indicative of an ion current generated across the spark gap; and
   an analysis module coupled to the ion sensing circuit and being operable to receive the ion signal and to analyze the ion signal to determine whether a no-combustion event occurred in the first cylinder.

2. A motorcycle as set forth in claim 1 wherein the analysis module includes:
   an integrator that receives the ion signal and produces a diagnostic voltage; and
   a microprocessor and memory coupled to the filter, the microprocessor receiving the diagnostic voltage and executing a software program in the memory to analyze the diagnostic voltage, and to determine whether a no-combustion event occurred in the first cylinder.

3. A motorcycle as set forth in claim 2 wherein the microprocessor further executes the software program to determine whether the diagnostic voltage is greater than a diagnostic calibration value.

4. A motorcycle as set forth in claim 3 wherein the microprocessor further executes the software program to decrement a counter each time the diagnostic voltage is greater than the diagnostic calibration value, and to increment a counter each time the diagnostic voltage is less than the diagnostic calibration value.

5. A motorcycle as set forth in claim 4 wherein the microprocessor further executes the software program to generate a code when the counter is greater than a no-combustion parameter value.

6. A motorcycle as set forth in claim 5 wherein the analysis module includes a terminal for communicating with a technician, and wherein the analysis module is further operable to communicate the no-combustion code to the technician via the terminal.

7. A motorcycle as set forth in claim 1 wherein the motorcycle further comprises an output device, wherein the analysis module is further operable to generate an output signal signifying no combustion in the first cylinder, and wherein the output device receives the output signal and generates an output in response to the output signal.

8. A method of determining whether a no-combustion event occurred in a two-cylinder engine of a motorcycle, the method comprising the acts of:
   providing a motorcycle including
     a frame,
     front and rear wheels coupled to the frame for rotation with respect to the frame,
     an engine mounted to the frame, the engine including a housing, a crankshaft mounted for rotation within the housing, first and second cylinders having first and second combustion chambers, respectively, and first and second pistons reciprocating in the first and second cylinders, respectively, and
     a spark generating circuit including a spark plug having a spark gap exposed to the first chamber;
   applying a spark-inducing signal to the spark generating circuit;
   obtaining an ion signal indicative of an ion current across the first spark plug gap; and
   analyzing the ion signal of determine if no combustion resulted when applying the spark-inducing signal to the spark generating circuit.

9. A method as set forth in claim 8 wherein the act of analyzing the ion signal includes:
   applying the ion signal to an integrator resulting in a diagnostic signal; and
   analyzing the diagnostic signal to determine if no combustion resulted when applying the spark inducing signal to the spark generating circuit.

10. A method as set forth in claim 9 wherein the act of analyzing the diagnostic signal includes:
    determining an analysis window;
    determining a diagnostic voltage of the diagnostic signal during the analysis window; and
    comparing the diagnostic voltage to a diagnostic calibration value.

11. A method as set forth in claim 10 wherein the act of analyzing the diagnostic signal farther includes the act of incrementing a counter when the diagnostic voltage is less than the diagnostic calibration value.

12. A method as set forth in claim 11 wherein the act of analyzing the diagnostic signal further includes the act of decrementing the counter when the diagnostic voltage is greater than the diagnostic calibration value.

13. A method as set forth in claim 11 wherein the act of analyzing the diagnostic signal further includes the act of generating a code when the counter is greater than a minimum number of events.

14. A method as set forth in claim 11, wherein the act of analyzing the diagnostic signal further includes the act of prior to the act of incrementing, determining if one or more predetermined conditions are met, and wherein the act of incrementing includes the act of incrementing the counter when the diagnostic voltage is less than the minimum calibration value and when the predetermined conditions are met.

15. A method as set forth in claim 14 wherein the act of determining if one or more predetermined conditions are met includes the act of determining if the engine speed is greater than a minimum engine speed.

16. A method as set forth in claim 14 wherein the act of determining if one or more predetermined conditions are met includes the act of determining if the engine load is greater than a minimum engine load.

17. A method as set forth in claim 8 and further comprising the act of analyzing the ion signal to determine if engine knock is present.

18. A method as set forth in claim 8 and further comprising the act of analyzing the ion signal to determine if an intermittent condition is present.

19. A method of determining whether a spark generating circuit of a motorcycle has an intermittent connection, the method comprising:

providing a motorcycle having a frame, an engine mounted to the frame, and a spark generating circuit mounted to the frame, the engine including a cylinder having a combustion chamber and a piston reciprocating in the first cylinder, and the spark generating circuit including a spark plug having a spark plug gap exposed to the first combustion chamber;

generating a spark in the combustion chamber with the first spark plug;

obtaining an ion signal indicative of an ion current across the spark plug gap; and analyzing the ion signal to determine if the spark generating circuit has an intermittent connection.

20. A method as set forth in claim 19, wherein the act of analyzing the ion signal includes the acts of:

determining an analysis window;

filtering the ion signal during the analysis window to produce a knock signal;

obtaining a peak-value of the knock signal during the time window; and comparing the peak-value to a maximum peak value.

21. A method as set forth in claim 20, wherein the act of filtering the ion signal includes the acts of:

applying the ion signal to a low-pass filter to produce a low-pass signal; and applying the low-pass signal to a band-pass filter having a frequency range to produce the knock signal.

22. A method as set forth in claim 20, wherein the act of analyzing the ion signal further includes the act of incrementing a first counter at each occurrence of the act of comparing the peak-value, and wherein the act of comparing the peak value to a maximum peak value includes the act of incrementing a second counter if the peak-value is greater than the maximum peak value.

23. A method as set forth in claim 22, wherein the act of analyzing the ion signal further includes the act of, prior to the incrementing acts:

determining if one or more predetermined conditions are met, and performing the incrementing acts if the predetermined conditions are met.

24. A method as set forth in claim 23 wherein the act of determining if one or more predetermined conditions are snot includes determining if the engine speed is greater than a minimum engine speed.

25. A method as set forth in claim 23 wherein the act of determining if one or more predetermined conditions are met includes the act of determining if the engine load is greater than a minimum engine load.

26. A method as set forth in claim 19 and further comprising the act of analyzing the ion signal to determine if engine knock is present.

27. A method as set forth in claim 19 and further comprising the act of analyzing the ion signal to determine if no combustion resulted in response to the spark-inducing signal.

28. A motorcycle comprising:

a frame;

at least two wheels coupled to the frame for rotation with respect to the frame;

an engine including a housing, a first cylinder having a first combustion chamber and a first piston reciprocating in the first chamber;

a spark generating circuit including the spark plug and being operable to generate an ion signal indicative of an ion current generated across the spark gap;

an ion sensing circuit including a spark plug and being operable to generate an ion signal indicative of an ion current generated across the spark gap; and an analysis module coupled to the ion sensing circuit to receive the ion signal and to analyze the ion signal to determine if the spark generating circuit has an intermittent connection.

29. A motorcycle as set forth in claim 28 wherein the analysis module includes:

a filter tat receives the ion signal and produces a knock signal;

a peak hold detector that receives the ion signal and produces a peak knock value over an analysis period; and a microprocessor and memory coupled to the peak hold filter, the microprocessor receiving the peak knock value and executing a software program to analyze the peak knock value to determine whether the spark generating circuit has an intermittent connection.

30. A motorcycle as set forth in claim 28 wherein the motorcycle further comprises an output device, and wherein the analysis module is further operable to generate an output signal signifying an intermittent connection in the cylinder to an operator.

31. A motorcycle as set forth in claim 29 wherein the microprocessor further executes the software program to determine whether the peak knock voltage is greater than a minimum diagnostic value.

32. A motorcycle as set forth in claim 29 wherein the microprocessor further executes the software program to determine whether the peak knock voltage is greater than a minimum diagnostic value for (n) spark-inducing events, to increment a counter (m) if one of the (n) spark-inducing events is greater than a minimum diagnostic value, and to generate a code if the counter (m) is greater than a parameter value.

33. A motorcycle as set forth in claim 28 wherein the analysis module includes a terminal for communicating with a technician, and wherein the analysis module is further operable to communicate the intermittent connection code to the technician.

* * * * *

UNITED STATES PATENT AND TRADEMARK OFFICE
CERTIFICATE OF CORRECTION

PATENT NO.    : 6,611,145 B2  Page 1 of 1
DATED         : August 26, 2003
INVENTOR(S)   : V. Dennis Lodise et al.

It is certified that error appears in the above-identified patent and that said Letters Patent is hereby corrected as shown below:

<u>Column 16,</u>
Line 45, "farther" should be -- further --.
Line 57, after "act of" insert -- , --.

<u>Column 17,</u>
Line 60, "snot" should be -- met --.

<u>Column 18,</u>
Line 30, "tat" should be -- that --.

Signed and Sealed this

Sixteenth Day of December, 2003

JAMES E. ROGAN
*Director of the United States Patent and Trademark Office*